(12) United States Patent
Iliev

(10) Patent No.: US 9,180,623 B1
(45) Date of Patent: Nov. 10, 2015

(54) SYSTEM, METHOD AND ARTICLE OF MANUFACTURE FOR BALLISTIC SHIELDING

(76) Inventor: Vall A. Iliev, Stow, OH (US)

( * ) Notice: Subject to any disclaimer, the term of this patent is extended or adjusted under 35 U.S.C. 154(b) by 265 days.

(21) Appl. No.: 13/219,920

(22) Filed: Aug. 29, 2011

(51) Int. Cl.
  *B23K 37/00* (2006.01)
  *B29C 65/06* (2006.01)

(52) U.S. Cl.
  CPC ................... *B29C 65/0672* (2013.01)

(58) Field of Classification Search
  CPC ............................ B29C 65/06; B29C 65/0672
  USPC ........................................................ 156/580
  See application file for complete search history.

(56) References Cited

U.S. PATENT DOCUMENTS

| | | | |
|---|---|---|---|
| 4,403,012 A | 9/1983 | Harpell et al. | |
| 4,457,985 A | 7/1984 | Harpell et al. | |
| 4,613,535 A | 9/1986 | Harpell et al. | |
| 4,623,574 A | 11/1986 | Harpell et al. | |
| 4,650,710 A | 3/1987 | Harpell et al. | |
| 4,737,402 A | 4/1988 | Harpell et al. | |
| 4,748,064 A | 5/1988 | Harpell et al. | |
| 5,552,208 A | 9/1996 | Lin et al. | |
| 5,587,230 A | 12/1996 | Lin et al. | |
| 6,642,159 B1 | 11/2003 | Bhatnagar et al. | |
| 6,841,492 B2 | 1/2005 | Bhatnagar et al. | |
| 6,846,758 B2 | 1/2005 | Bhatnagar et al. | |
| 7,762,175 B1 | 7/2010 | Bhatnagar et al. | |
| 7,964,267 B1 * | 6/2011 | Lyons et al. | 428/156 |

* cited by examiner

*Primary Examiner* — Brent O'Hern
(74) *Attorney, Agent, or Firm* — John D Gugliotta

(57) ABSTRACT

A composite ballistic shielding material is formed utilizing ribbons of randomly-oriented film, laid up or woven in bias plies. The sheet plies are made narrow strips of PVC films are held side-by-side and rigidly framed as a square, into a thin layer, and then trimmed. The strips may be approximately 0.010" wide. The formed up layer is then immersed in a low-hardness thermosetting liquid glue and laid down as a first ply. Subsequent plies are made by repeating the same process, and adding the step of rotating the frame to a pre-determined angle before laying down the ply onto the previous ply. When a pre-determined number of layers or a desired thickness is achieved, the lay-up is transferred to a press for curing into panels. The instant abstract is neither intended to define the invention disclosed in this specification nor intended to limit the scope of the invention in any way.

6 Claims, 7 Drawing Sheets

SYSTEM, METHOD AND ARTICLE OF MANUFACTURE FOR BALLISTIC SHIELDING

BACKGROUND OF THE INVENTION

1. Field of the Invention

This invention relates to composite panels having superior ballistic resistant properties and, more particularly, to a system of manufacture for composite ballistic shielding with a very low cost-weight ratio, and a very low cost-strength ratio and without using fiber as the reinforcement.

2. Description of the Related Art

Ballistic resistant articles containing high [tensile] strength fibers that have excellent properties against projectiles are well known. High strength fibers conventionally used include polyolefin fibers, such as extended chain polyethylene fibers; and aramid fibers, such as para- and meta-aramid fibers. For many applications, the fibers may be used in a woven or knitted fabric. For other applications, the fibers may be encapsulated or embedded in a matrix material to form non-woven, rigid or flexible fabrics.

Various ballistic resistant constructions are known that are useful for the formation of hard or soft armor articles such as helmets, structural panels and ballistic resistant vests. For example, U.S. Pat. No. 4,403,012, U.S. Pat. No. 4,457,985, U.S. Pat. No. 4,613,535, U.S. Pat. No. 4,623,574, U.S. Pat. No. 4,650,710, U.S. Pat. No. 4,737,402. U.S. Pat. No. 4,748,064, U.S. Pat. No. 5,552,208, U.S. Pat. No. 5,587,230, U.S. Pat. No. 6,642,159, U.S. Pat. No. 6,841,492, U.S. Pat. No. 6,846,758, and U.S. Pat. No. 7,762,175, all of which are incorporated herein by reference, describe ballistic resistant composites which include high strength fibers made from materials such as extended chain ultra-high molecular weight polyethylene. These composites display varying degrees of resistance to penetration by high speed impact from projectiles such as bullets, shells, shrapnel and the like.

For example, U.S. Pat. Nos. 4,623,574 and 4,748,064 disclose simple composite structures comprising high strength fibers embedded in an elastomeric matrix. U.S. Pat. No. 4,650,710 discloses a flexible article of manufacture comprising a plurality of flexible layers comprised of high strength, extended chain polyolefin (ECP) fibers. The fibers of the network are coated with a low modulus elastomeric material. U.S. Pat. Nos. 5,552,208 and 5,587,230 disclose an article and method for making an article comprising at least one network of high strength fibers and a matrix composition that includes a vinyl ester and diallyl phthalate. U.S. Pat. No. 6,642,159 discloses an impact resistant rigid composite having a plurality of fibrous layers which comprise a network of filaments disposed in a highly rigid matrix, with elastomeric layers there between. The composite is bonded to a hard plate to increase protection against armor piercing projectiles.

All of these known references involve the use of fibers to build the composites, in the form of a roving, ply, or yarn. However, it has been found that the use of fibers, per se, is not necessary to achieve superior ballistic resistance in a composite.

Consequently, a need has been felt for providing improved composite panels having superior ballistic resistant properties while having no requirement for using fiber as the reinforcement.

SUMMARY OF THE INVENTION

It is therefore an object of the present invention to provide a system of manufacture for composite ballistic shielding with a very low cost-weight ratio, and a very low cost-strength ratio.

It is a feature of the present invention to provide composite panels having superior ballistic resistant properties.

Briefly described according to the preferred embodiment of the present invention, a composite ballistic shielding material is formed utilizing ribbons of randomly-oriented film, laid up or woven in bias plies. The sheet plies are made narrow strips of PVC films are held side-by-side and rigidly framed as a square, into a thin layer, and then trimmed. The strips may be approximately 0.010" wide. The formed up layer is then immersed in a low-hardness thermosetting liquid glue and laid down as a first ply. Subsequent plies are made by repeating the same process, and adding the step of rotating the frame to a pre-determined angle before laying down the ply onto the previous ply. When a pre-determined number of layers or a desired thickness is achieved, the lay-up is transferred to a press for curing into panels.

This general process for making such panels may be automated, allowing the ribbons to be cut from a film roll, immediately after it is framed and trimmed into plies. Once the film is trimmed off around the perimeter of the rectangular frame assembly, it is pressed between two matched plates, each with an array of multiple aligned cutting edges that, together, shear the film into ribbons. The frames are handled robotically as they secure the film from the roll, to the cutters, then to a turntable, where the ribbon plies are laid down, sprayed, then released, while the frames cycle around to begin the process again.

In addition to the application of the thermoset material between plies, a step of spraying may incorporate several other materials, such as flame-retardants and carbon nanotubes suspended in solution. The application of such materials can improve various performance characteristics of the ballistic panels, as required. A computer numerical program can be used to coordinate the position of the frames from one station to the next, to control the actions for every component in the entire manufacturing system (from the film spools to the presses) and to thereby fabricate the desired composition and bias arrangement for the ballistic panels.

The use of simple ribbons of randomly-oriented film, laid up or woven in bias plies, has been found to allow for an ultra-tough ballistic composite. It has also been found, with certain composite constructions, that using a reinforcing material that has a relatively high tensile strength may not be as effective as using a reinforcing material with a relatively high modulus of elasticity as well as a relatively high elongation (up to about 25%).

Other physical properties of the reinforcing material itself, such as impact resistance or dynamic coefficient-of-friction, may further have a surprisingly greater influence on the performance of ballistic composites than once thought. Indeed, the composite comprised by this present invention exhibits unusual and unexpected characteristics. First, the reinforcement material has a lower tensile strength than the matrix material. Second, the reinforcement material actually gives the composite lower impact resistance than the matrix material possesses alone. Third, the coefficient of friction in the reinforcement material is unusually high. And, although it is a true reinforcement for impact-type dynamic loading, the present invention appears to behave more like a "frictional" composite, or other words, it's strength appears to be derived from the frictional sliding motion generated between ribbon-like strands upon impact, which converts the kinetic impact energy into heat.

This capability allows the present frictional composite to achieve ballistic resistance at a much lower cost-to-strength ratio than with traditional ballistic composites typically found on the market.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
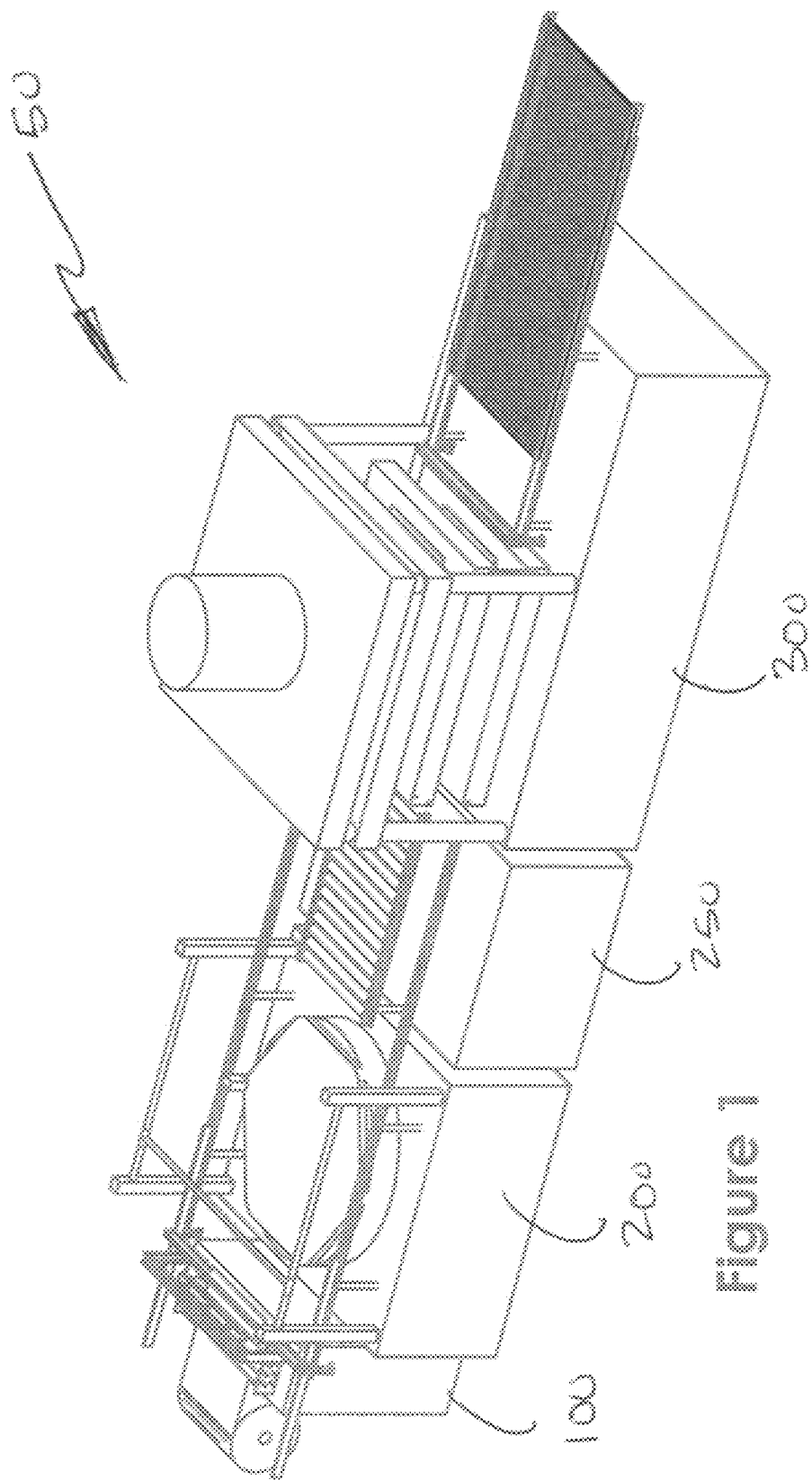
FIG. 1 is perspective view of a system for the manufacture of an article of ballistic shielding according to the preferred embodiment of the present invention.

Referring now to FIG. 1, an overall view of a system for the manufacture of an article of ballistic shielding panels is shown, generally noted as 50, according to the preferred embodiment of the present invention. This system 50 is made up of four main stations: the Shaper-Slitter Station 100, the Rotary Table Station 200, a Support-Transfer Platform 250, and the Curing Station 300. Not shown herein is a robotics assembly anticipated as being capable of being is programmed to handle assembled frames of film material, throughout every step of the fabrication process. It should be known to one having ordinary skill in the relevant art that such a robotics assembly is common technology in the manufacturing industry, and may be used in the present intention to automate the entire process.

Figure 2:
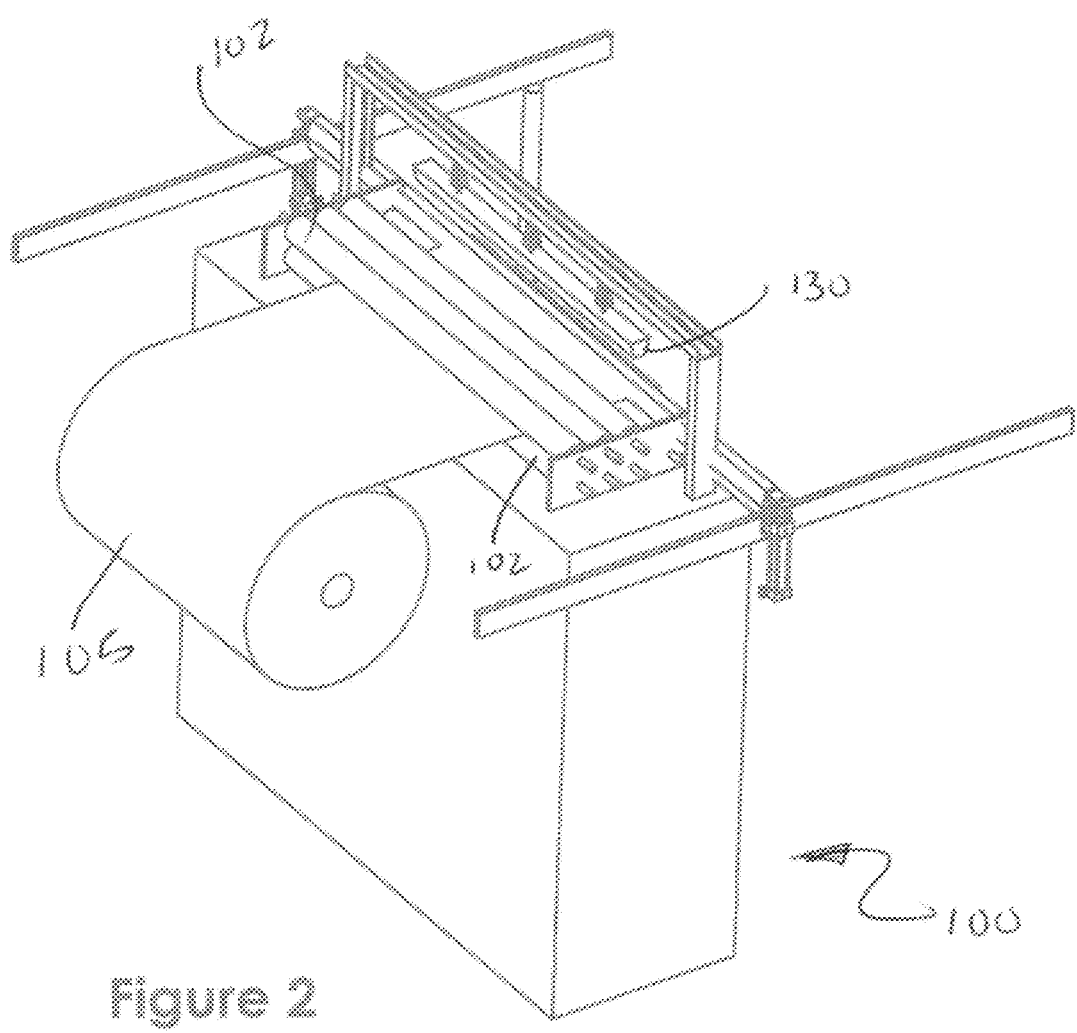
FIG. 2 is a perspective view of a shaper-slitter station 100 for use therewith.

The four main stations 100, 200, 250, 300 of the system 50 may be aligned along a setup axis which connects the midpoint of each station, wherein automation can be implemented. To facilitate such an automated system, raw film material is fed from a spool into the Shaper-Slitter Station 100, as shown in conjunction with FIG. 2. At the Shaper-Slitter Station 100, the raw material 105 is fed from a roll between motorized rollers 102 that urge a segment of the film captured between the rollers 102 in order to grab a section of material pair within multiple CNC grip placement bars 130 (with only one shown for clarity) to control the sheet and strip tension layers during transfer to the rotary table 200. Static and dust may be further controlled as the desired width of material is fed, slitted and shaped. Once the film segment is held in position between they are pressed together. The section of film material is slit and cut into plurality of generally elongated, narrow ribbons, each of which may be about 0.010" wide. The ribbons are aligned side-by-side and parallel to the setup axis, to form a ply.

Figure 4:
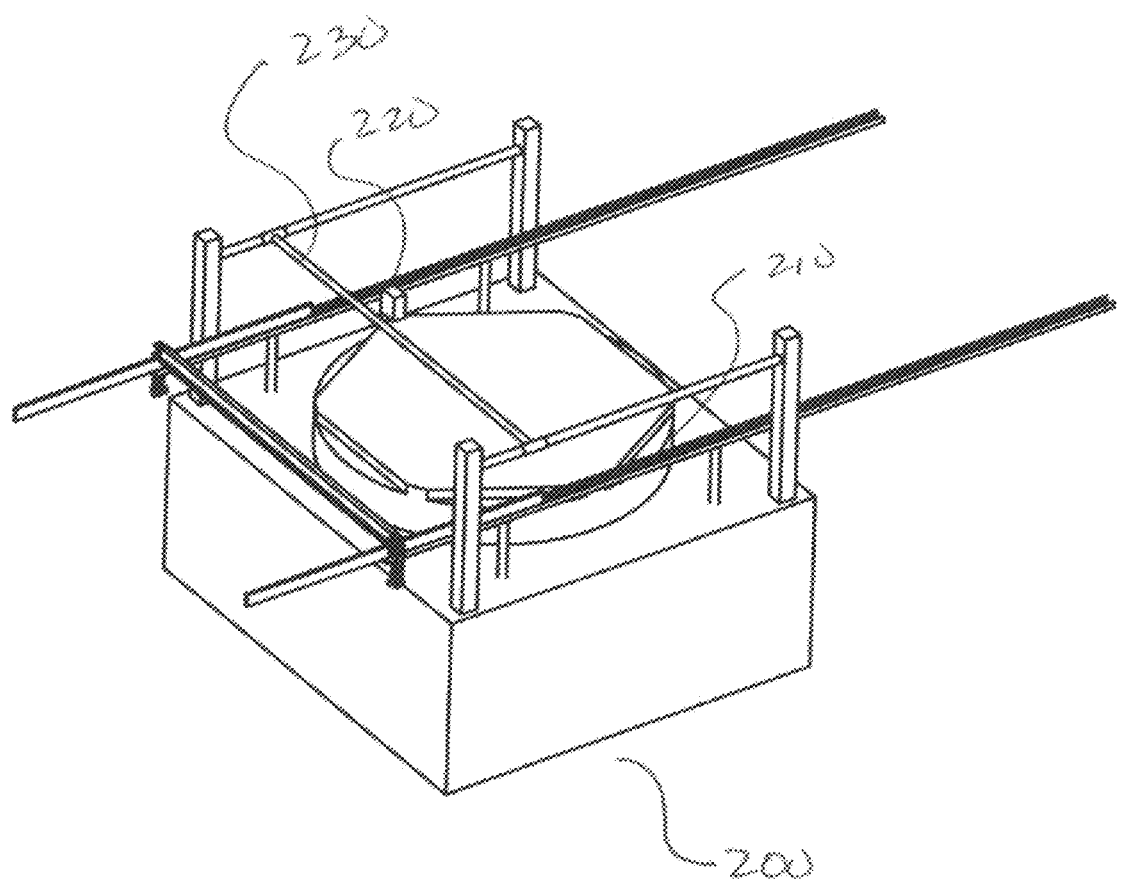
FIG. 4 is a perspective view of a Rotary Table Station 200 for use therewith.

The slitted material is then transferred to the Rotary Table Station 200, shown in greater detail in conjunction with FIG. 4, which may be set to a predetermined bias angle prior to receiving the material 150. Once the new ply is positioned onto the previous layer of film (or the table), the new ply is then sprayed with matrix material. While it would be apparent to a person having ordinary skill in the relevant art, in light of the present disclosure, to utilize a matrix material formed of any low-hardness thermosetting liquid glue. Additionally, it would be apparent that further performance enhancing additives, such as flame retardants, or carbon nanotube particles, can be deposited on the material 150 between various layers. However, as should also be apparent by the present disclosure, the use of such a material is intended as merely one example, and is not and not intended to be a limitation of the scope, features or functions of the present invention.

The placement of additional layers of material continues to be added automatically from the ShaperSlitter Station 100 from which another ply is provided. This procedure of laying-up a successive layer of ribbon film is repeated until a predetermined thickness, or number of plies, is achieved.

As shown in greater detail in FIG. 1-4, the Shaper-Slitter Station 100 provides a segment of film 150 pulled taut from a Film Spool 105 by the set of Flattening Rollers 102 and loaded onto the turntable 210. As shown, the film segment 150, once layered to the desire thickness or number of plies, is transferred to the curing station 300 via a support/transfer platform 250. When the film is in place, the press 300 is closed to provide the desired pressure and temperature for curing of the matrix material into sheets.

Figure 3:
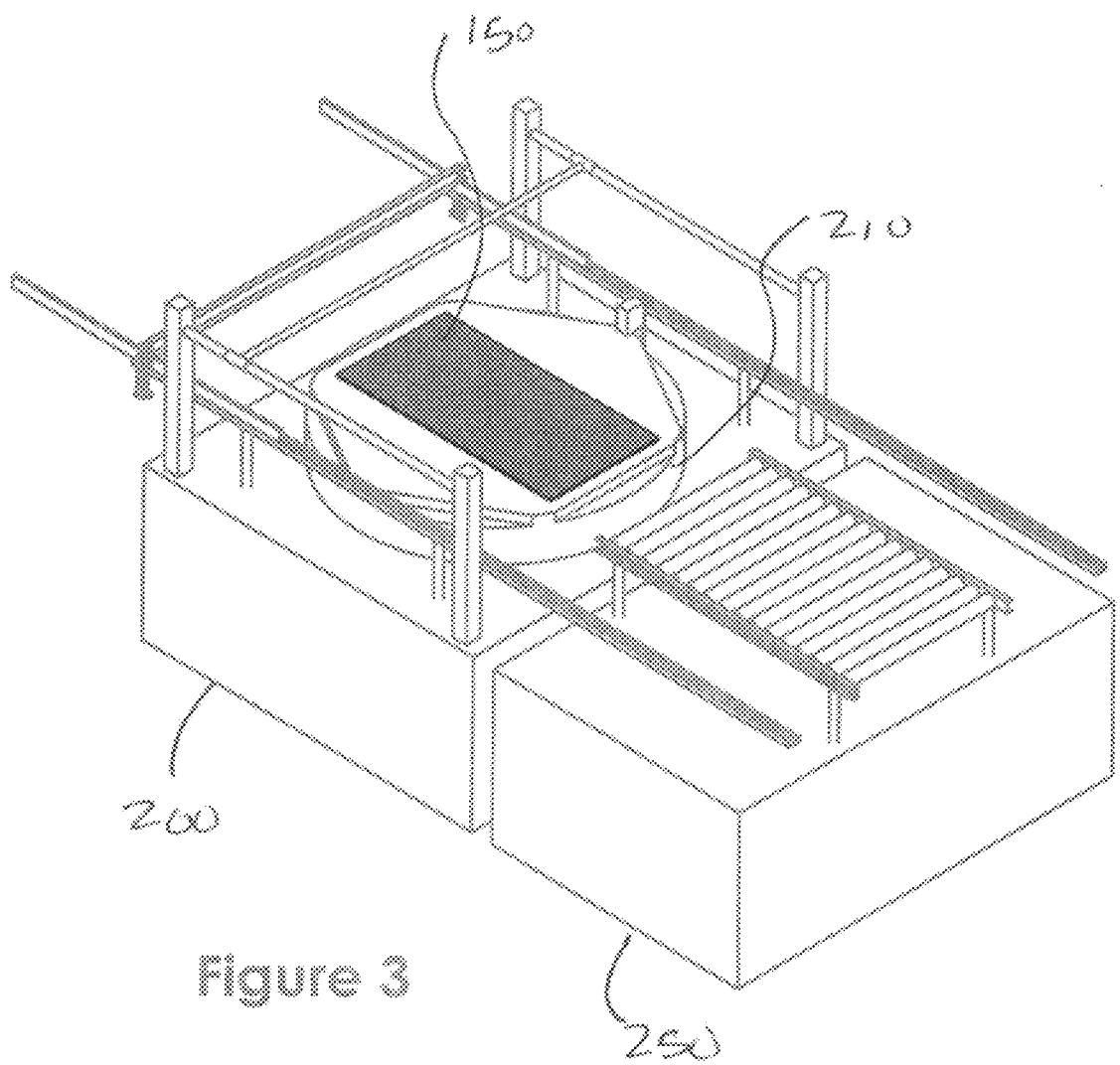
FIG. 3 is a detailed perspective view of a Lower Lifter Frame Section 150 for use therewith.

As further shown in conjunction with FIG. 3-4, the Rotary Table Station 200 can be oriented accordingly. The orientation of the Rotary Table 210 is monitored by the Laser Position Sensor 220. Once a ply is lowered onto the table, or onto a previous ply, the Sprayer 230 automatically coats the new ply with a prepared mixture of matrix material. The finished lay-up stack [of plies] is then transferred robotic ally to the next station.

Figure 5:
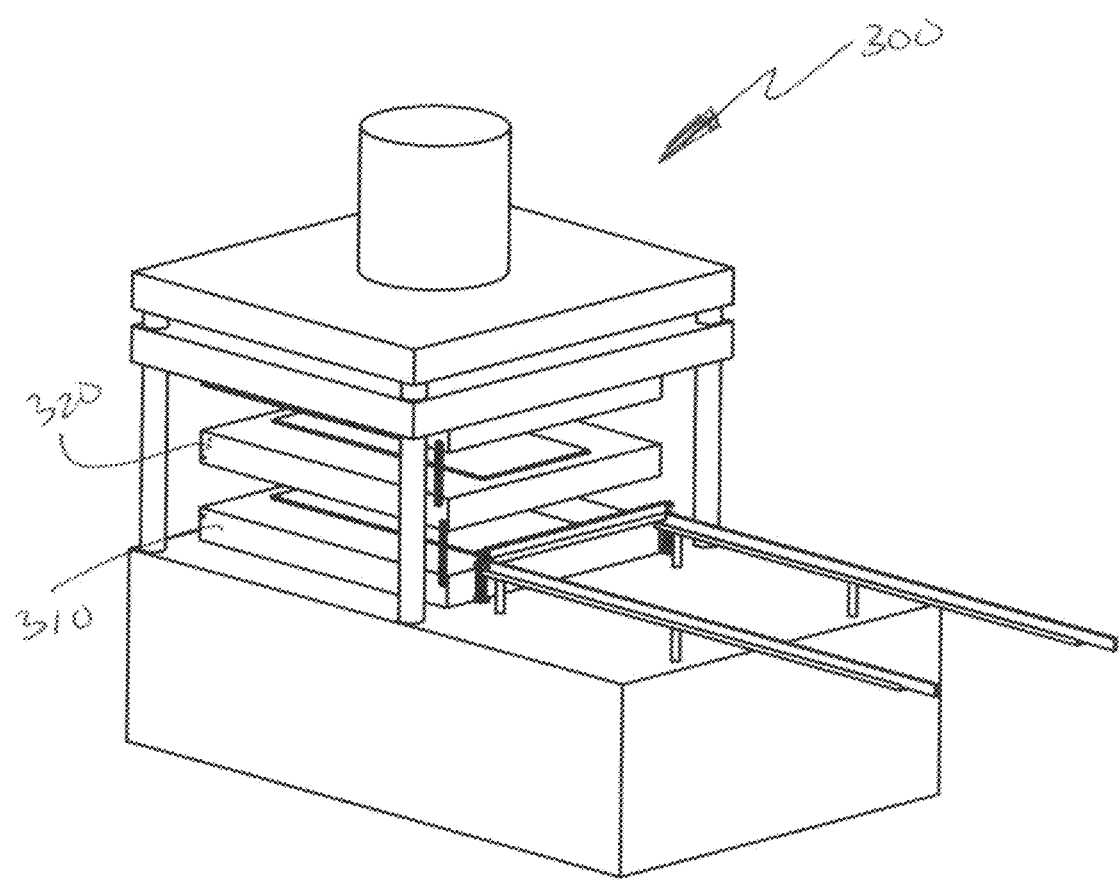
FIG. 5 is a perspective view of a Curing Station 300 for use therewith.

Referring now to FIG. 5, the Curing Station 300 in shown in greater detail. The completed ply stacks get automatically transferred and inserted into a curing chamber 310 between a pair of curing platens 320. Once a preset number of curing chambers is occupied, the press will close and begin a curing cycle. After the panels are cured at approximately 250 F, they are removed automatically and stored.

2. Operation of the Preferred Embodiment

Figure 6:
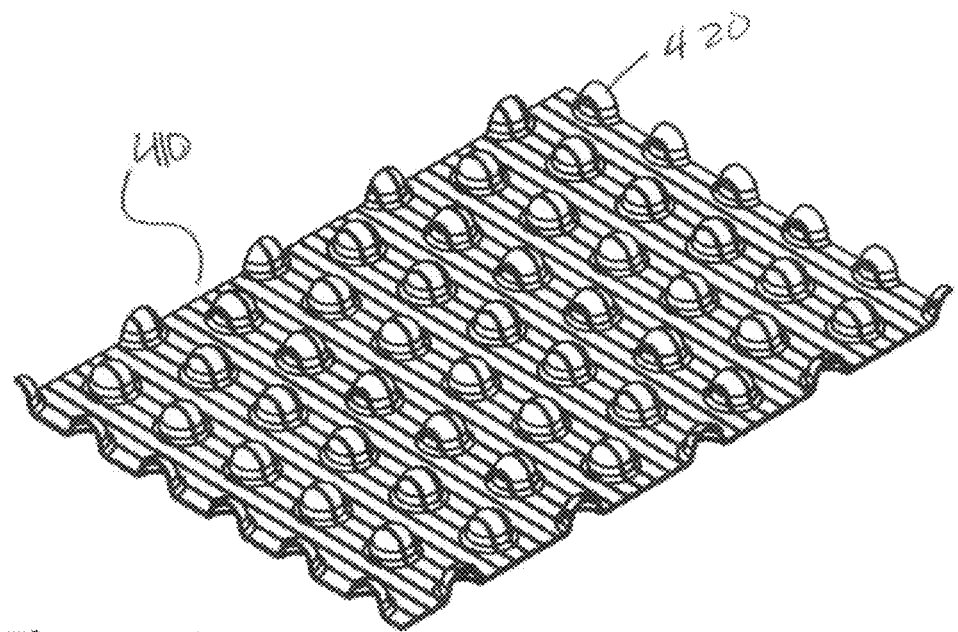
FIG. 6 is a perspective view of a shaped-ribbon bias plies formed according to the preferred embodiment of the present invention.
Figure 7:
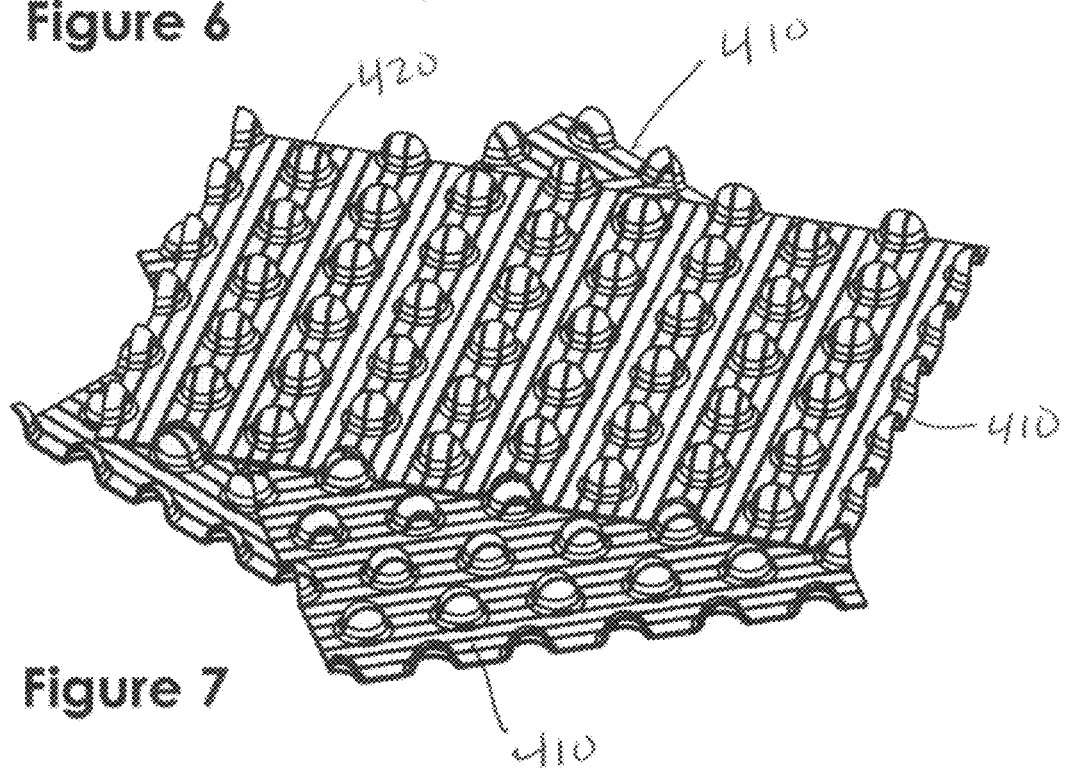
FIG. 7 is a perspective view of a lay-up of three shaped-ribbon bias plies of the type shown in FIG. 6.
Figure 8:
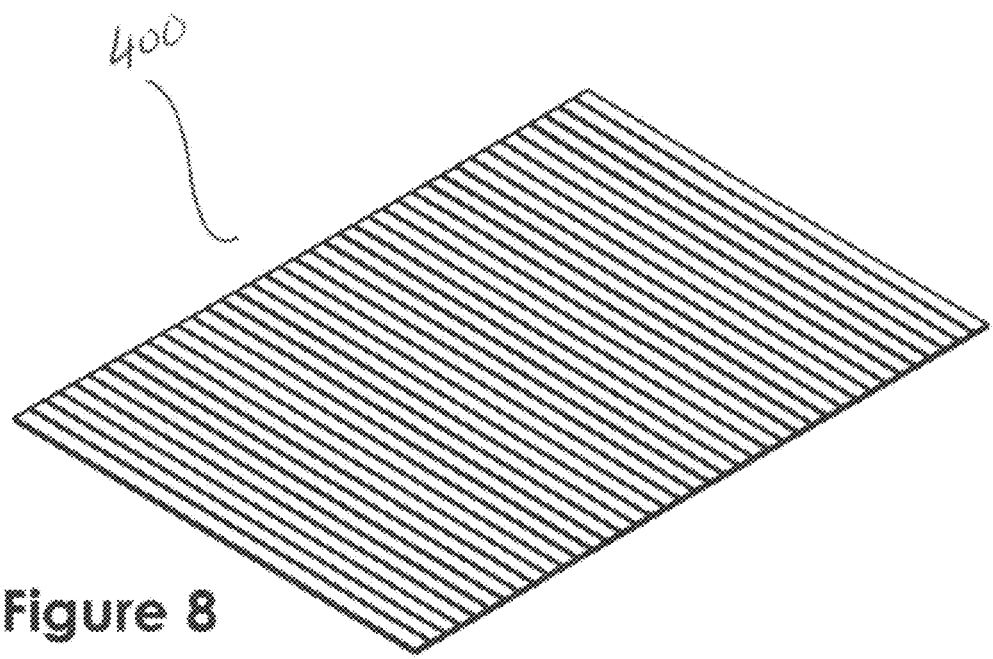
FIG. 8 is a perspective view of a lay up of three flat-ribbon bias plies formed according to the preferred embodiment of the present invention.
Figure 9:
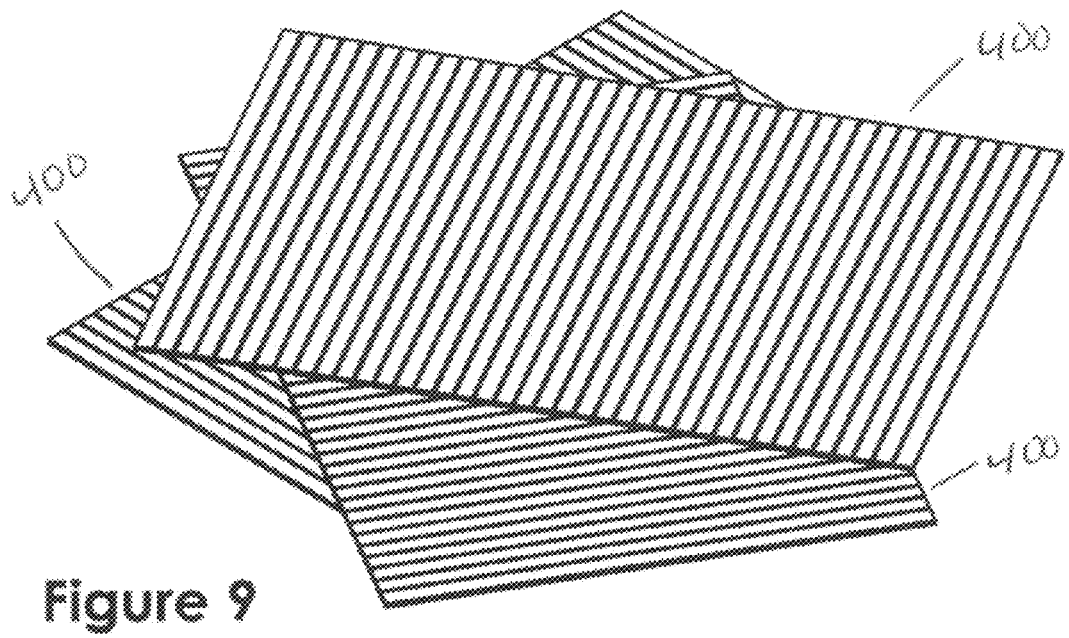
FIG. 9 is a perspective view of a lay-up of three flat-ribbon bias plies of the type shown in FIG. 7.

In operation, the system for the manufacture of an article of ballistic shielding panels according to the present invention can provide composite panels having superior ballistic resistant properties. As shown in FIG. 8-9, a lay up of three flat-ribbon bias plies formed according to the preferred embodiment of the present invention can be used to form a stack (herein shown as three) Flat-ribbon Plies 400 that are each oriented at an angle to the others. The ribbon widths appear exaggerated in this figure to aid illustration, and the use of only three plies is illustrative as well and not meant as a limitation. Further, as shown in FIG. 6-7, the use of Shaped-ribbon Plies 410 can be provided, each oriented at an angle to the others. The plies 410 of such as shaped-ribbon stack may not only be sliced into ribbons, but also shaped with an array or pattern of domes 420. These shaped domes 420 are arranged in such a pattern that the domed plies align with each other at angles of either 60° or 120°. The coincident alignment of these shaped features is thought to greatly increase the frictional properties of the ribbon layers.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A system of manufacture of fiberless composite ballistic shielding comprising:
    forming a plurality of individual layers, each said layer comprising a plurality of film strips oriented side by side and affixed with a thermosetting adhesive, wherein each said plurality of narrow film strips are less than approximately 0.010" in width;
    orienting adjacent said individual layers at a bias angle and to a pre-determined number of layers or a desired thickness;
    applying thermosetting adhesive between said adjacent said individual layers; and
    pressing and curing said oriented plurality of layers to form a panel.

2. The system of claim 1, wherein the film forming said film strips has a modulus of elasticity less than 25%.

3. The system of claim 1 further adapted for automated control, wherein said film strips are formed from a film roll pressed between two matched plates, each with an array of multiple aligned cutting edges that, together, shear the film into ribbons.

4. The system of claim 1, further comprising incorporating functional additive materials between plies.

5. The system of claim 4, wherein said functional additive material is selected from the group consisting of: flame-retardants; and, carbon nanotubes suspended in solution.

6. A system of manufacture of fiberless composite ballistic shielding comprising:
    forming a plurality of individual layers, each said layer comprising a plurality of film strips oriented side by side and affixed with a thermosetting adhesive, wherein each said plurality of narrow film strips are less than approximately 0.010" in width;
    orienting adjacent said individual layers at a bias angle and to a pre-determined number of layers or a desired thickness;
    adding a functional additive material selected from the group consisting of: flame-retardants; and, carbon nanotubes suspended in solution;
    applying thermosetting adhesive between said adjacent said individual layers; and
    pressing and curing said oriented plurality of layers to form a panel.

* * * * *